United States Patent [19]

Larsson

[11] 4,367,478

[45] Jan. 4, 1983

[54] PRESSURE PULSE DROP EJECTOR APPARATUS

[75] Inventor: Stig-Göran Larsson, Carrollton, Tex.

[73] Assignee: Xerox Corporation, Stamford, Conn.

[21] Appl. No.: 193,681

[22] Filed: Oct. 3, 1980

Related U.S. Application Data

[63] Continuation of Ser. No. 33,090, Apr. 25, 1979, abandoned.

[51] Int. Cl.³ ............................................. G01D 15/16

[52] U.S. Cl. ................................................. 346/140 R

[58] Field of Search ..................... 346/140 R; 400/126

[56] References Cited

U.S. PATENT DOCUMENTS 3,452,360 6/1969 Williamson ........................ 346/140

3,832,579 8/1974 Arndt .............................. 346/140 X 4,072,959 2/1978 Elmquist ............................ 346/140

4,189,734 2/1980 Kyser ................................. 346/140

FOREIGN PATENT DOCUMENTS 1500908 6/1974 United Kingdom .

1532686 5/1976 United Kingdom .

*Primary Examiner*—Joseph W. Hartary

*Attorney, Agent, or Firm*—Richard A. Tomlin

[57] ABSTRACT

A pulsed liquid droplet ejecting apparatus wherein a rectangular piezoelectric transducer is arranged abaxially to an ink containing channel. The edge of the transducer opposite the channel is held fixed so that on excitation of the transducer by an electrical pulse, the transducer extends towards the channel compressing it and ejecting a droplet therefrom.

5 Claims, 4 Drawing Figures

PRESSURE PULSE DROP EJECTOR APPARATUS

This is a continuation, of application Ser. No. 33,090, filed, Apr. 25, 1979, now abandoned.

The invention relates to a pulsed liquid droplet ejecting apparatus wherein a piezoelectric transducer is arranged abaxially to an ink channel. When excited, the transducer extends towards the channel causing the channel to be compressed, which in turn compresses ink contained within the channel.

The invention can be utilized in any pressure pulse drop ejector apparatus; however, the greatest benefits are realized when the in-plane extensional mode transducer system of this invention is utilized in an ink jet recording system. Accordingly, the present invention will be described in connection with an ink jet recording system.

Ink jet recorders are well known in the art, many commercial units being presently on the market. Generally, these ink jet printers utilize a piston-like push-pull action to eject ink drops from a small nozzle to form an image. Typically, a piezoelectric transducer is used to provide the piston-like action. A piezoelectric transducer is a device, which converts electrical energy into mechanical energy. In U.S. Pat. No. 2,512,743 to C. W. Hansell, issued June 27, 1950, an ink jet was described in which the circular piezoelectric transducer was used in an extensional mode, the extension being along the axis to drive ink. The piezoelectric transducer was arranged coaxially with a conical nozzle, the axial extension used to create pressure waves causing expression of droplets from the nozzle. Several other transducer arrangements have been proposed. A basic arrangement was disclosed in an article co-authored by the present inventor: "The Piezoelectric Capillary Injector—A New Hydrodynamic Method for Dot Pattern Generation" by Erik Stemme and Stig-Göran Larsson, *IEEE Transactions on Electron Devices*, January, 1973, pp. 14–19. In that disclosure, a system is disclosed in which a bilaminar piezoelectric metallic disk is used to drive ink coaxially with the bilaminar disk. In that system, application of an electrical voltage pulse across the disk causes an inward, that is, towards the ink, deflection, which forces ink droplets out of an orifice. U.S. Pat. No. 3,946,398, issued Mar. 23, 1976, shows a similar device; however, as disclosed in that patent, the deflection of the disk is used to eject ink through an orifice, the axis of drop ejection being perpendicular to the axis of the disk.

Two other arrangements are shown in U.S. Pat. No. 3,857,049, issued Dec. 24, 1974. In the arrangement shown in FIG. 1 through FIG. 4 of that patent, a tubular transducer surrounds a channel containing the ink; and the transducer, when excited by application of an electrical voltage pulse, squeezes the channel to eject a droplet. As shown in FIG. 6 of that patent, there is disclosed a system in which the radial expansion of a disk in response to an electrical voltage pulse is used to compress ink in circumferential channels thereby forcing ink droplets out of a nozzle. Other arrangements are also known. The reason why so many different arrangements have been proposed is that experimenters are striving to provide a system, which is economical, efficient, reliable and sufficiently compact to be capable of being used in a printer array. A proper design, for example, would provide for ease of cleaning and priming. Further, the design would have to be such that entrained air bubbles could readily be removed.

The invention as claimed is intended to provide a useful pressure pulse drop ejector wherein a substantially linear edge of a substantially rectangular transducer is arranged abaxially along a channel and caused to compress ink in the channel to eject a drop. A main advantage of the invention is that the ink path is a straight channel, which makes the ink circuit easy to prime. Also, air bubbles are easily removed since there are no corners or dead spaces in which bubbles can be trapped. Also, the invention, by utilizing a linear edge of a transducer abaxially along a channel, allows for increased array "packing", that is, more transducers and nozzles can be placed in a smaller area than with prior art designs. This advantage is extremely important in high-speed printer design.

The invention can better be understood by reference to the following description particularly when taken in conjunction with the attached drawings.

In all of the Figures, for clarity, similar parts have been given similar number designations.

Figure 1:
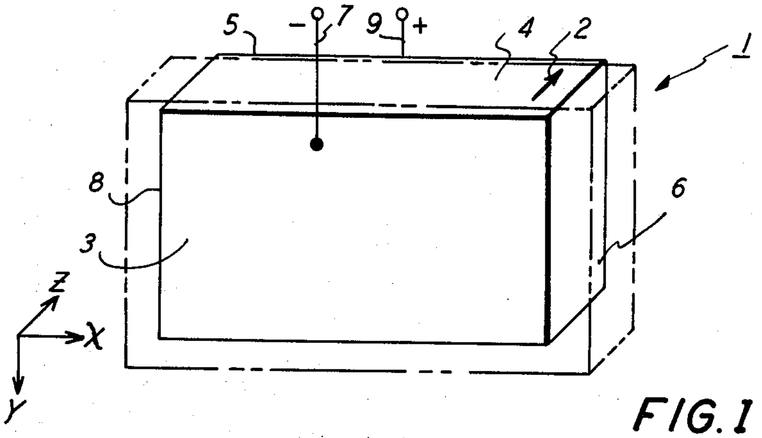
FIG. 1 is a perspective view of a piezoelectric transducer on which the X, Y and Z directions are noted to aid in understanding the in-plane extensional mode transducer.
Figure 2:
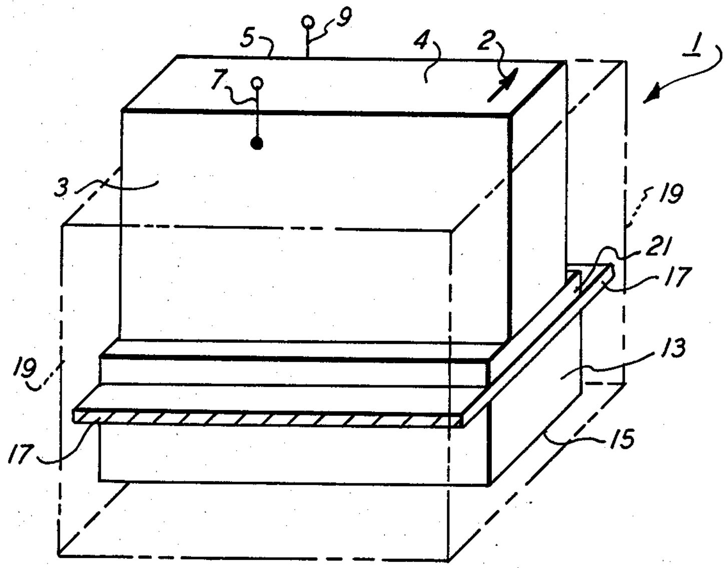
FIG. 2 is a perspective view showing how a transducer used in the in-plane extensional mode may be abaxially oriented to a substantially linear channel.

Referring now to FIG. 1, there is seen a perspective view of a rectangular piezoelectric member generally designated 1. Piezoelectric member 1 is coated on surfaces 3 and 5 with a conductive material. An electric voltage pulse generator (not shown) is connected to conductive surfaces 3 and 5 by electrical lead wires 7 and 9. Piezoelectric member 1 is polarized in the direction 2 during manufacture. Application of an electric field in a direction opposite to the polarization direction 2 causes piezoelectric member 1 to contract, that is, to become thinner in the Z dimension. When this occurs, piezoelectric member 1 expands or extends in both the X and Y dimensions as indicated by the broken lines. The planar movement of the ends and edges of the rectangular piezoelectric member 1 away from its center is referred to herein as in-plane extensional movement. The piezoelectric member 1 is extended in the X and Y dimensions when excited by an electric voltage pulse applied between electrical leads 7 and 9. In the present invention, one edge 4 of piezoelectric member 1 is fixed, for example, by means such as block 11 in FIGS. 3 and 4. The Y dimension expansion of piezoelectric member 1 can, therefore, cause extensional movement only in a direction away from block 11. This extensional movement is transmitted to ink 13 in channel 15 as shown in FIG. 2. To increase the Y directional movement even further, edges 6 and 8 may be fixed. This restrains the in-plane extensional movement of the piezoelectric member in the X direction, which results in an increase in the Y direction movement of approximately 30%.

Referring now to FIG. 2, there is shown piezoelectric member 1, which is held firmly in place at one edge 4 by means not shown. A "foot" 21 has been bonded to the opposite edge of piezoelectric member 1. The foot 21 increases the effective width of piezoelectric member 1 and provides a larger volume of ink expulsion than would otherwise be obtainable without increasing the width of piezoelectric member 1. It is desirable to use foot 21 rather than increase the thickness of piezoelectric member 1 because a higher voltage is required to drive thicker members to get the same volume deformation. Also, better electrical isolation is obtainable between piezoelectric members in an array. The movement of foot 21 is in turn transmitted to ink 13 in channel 15 through a flexible membrane 17. The membrane 17 must allow the movement of member 1 to be transferred to the ink 13 and prevent the ink 13 from penetrating up around foot 21 and piezoelectric member 1. The channel 15 has rigid walls and is rigidly fixed in relation to fixed edge 4. The movement of member 1 creates sufficient pressure and volume deformation in ink 13 to expel drops from an orifice 23 (see FIGS. 3 and 4). The space surrounding piezoelectric member 1 between the fixing block 11 and fixed channel 15 is filled with an insulating material 19. The material 19 must be relatively insulating because it is in contact with conductive surfaces 3 and 5 and must be relatively flexible to allow extensional movement and shrinkage of piezoelectric member 1 in the X, Y and Z directions. Channel 15 may be a self-supporting tube or channel or may be a hole machined, etched or cast in any suitable material.

The volume deformation obtainable from the in-plane extensional mode transducer of this invention can be approximated using the following equation:

$$\Delta V = -1_x 1_y w[d_{31}E + (w/1_z)s_{11}^E p]$$

wherein $\Delta V$ is the volume deformation; p is the pressure in the ink; E is the electrical field applied to piezoelectric member 1; $1_x 1_y$ and $1_z$ are length, height and thickness of piezoelectric member 1; w is width of foot 21; $s_{11}^E$ is the compliance constant of the piezoelectric material; and $d_{31}$ is the piezoelectric constant of the piezoelectric material.

It can be seen from the equation that the pressure applied to ink 13 and the volume deformation can be independently controlled through the control of width of foot 21 and by separately controlling the X, Y and Z dimensions of piezoelectric member 1.

Figure 3:
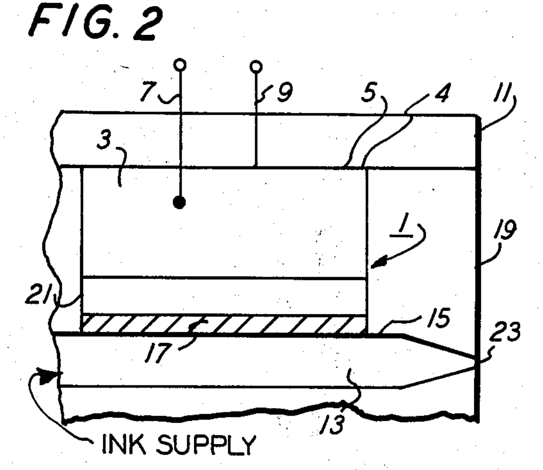
FIG. 3 is a side view of an exemplary pressure pulse drop ejector utilizing an extensional mode transducer abaxially to an ink containing channel.

In the FIG. 3 arrangement, a channel 15 is formed in insulating flexible member 19. This channel may be formed, for example, by drilling or any other convenient method after piezoelectric member 1, leads 7 and 9 and foot 21 are in place. FIG. 3 demonstrates the simplicity of design made possible through the use of an in-plane extensional mode piezoelectric transducer. The ink flow is relatively linear from the point of ink supply (not shown) through the channel 15 to outlet nozzle 23. By way of example, piezoelectric member 1 is made of piezoceramic PZT-5H, available from Vernitron Piezoelectric Division, Bedford, Ohio, and measures 0.25 mm thick by 5 mm high by 15 mm long. Channel 15 is circular in cross-section and measures about 0.75 mm in diameter and has an orifice 23 of about 50 micrometers in diameter. The foot 21 is about 0.75 mm wide. A potential application of about 50 volts at a frequency of about 8 kilohertz has been found useful in a printer environment.

Figure 4:
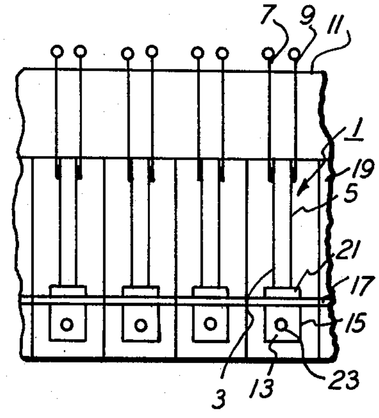
FIG. 4 shows a cross-sectional schematic representation of an end view of an array utilizing abaxial transducers.

FIG. 4 shows schematically how an array of nozzles could be prepared utilizing the design of FIG. 2. In this case, a number of pressure pulse drop ejectors have been placed in side-by-side relationship to form an array. Bar 11 is used to fix piezoelectric members 1 in place. Such an array would be useful in, for example, a high-speed printer.

Although specific embodiments and components have been described, it will be understood by those skilled in the art that various changes in the form and details may be made therein without departing from the spirit and scope of the invention. For example, the channel 15 cross-section could be circular, rectangular or of any other conveniently formed shape. Further, the piezoelectric member 1 could be replaced by an electrostrictive or magnetostrictive member.

What is claimed is:

1. A pulsed liquid droplet ejecting apparatus wherein a piezoelectric transducer is utilized in the in-plane extensional mode, comprising a piezoelectric transducer having conductive sidewalls connectable to a source of electrical voltage through electrical leads, a channel positioned to be compressed by a first edge of said piezoelectric transducer upon application of electrical voltage to said sidewalls to expel liquid droplets from an orifice characterized in that said piezoelectric transducer is substantially rectangular and is aligned abaxially to said channel, and said first edge of said piezoelectric transducer and said channel are substantially linear, and said liquid droplets are ejected in a direction parallel to the axis of said substantially linear channel.

2. The apparatus as claimed in claim 1 and further including an enlarged foot provided between said first edge of said piezoelectric transducer and said channel.

3. The apparatus as claimed in claim 1 and further including a flexible membrane positioned between said first edge of said piezoelectric transducer and said channel.

4. The apparatus as claimed in claim 1 wherein an edge opposite said first edge of said piezoelectric transducer is fixed in relation to said channel.

5. The apparatus as claimed in claim 4 wherein the edges of said piezoelectric transducer, which are perpendicular to said first edge, are fixed such that the in-plane distance between said edges is substantially constant.

* * * * *